_United States Patent_ [19]

Lepley

[11] Patent Number: 4,975,013

[45] Date of Patent: Dec. 4, 1990

[54] BOTTOM DISCHARGE APPARATUS FOR STORAGE VESSEL

[75] Inventor: James W. Lepley, Smithville, Ohio

[73] Assignee: Flying Dutchman, Inc., Smithville, Ohio

[21] Appl. No.: 424,063

[22] Filed: Oct. 19, 1989

[51] Int. Cl.$^5$ .............................................. B65G 1/00
[52] U.S. Cl. .................................... 414/324; 414/327
[58] Field of Search ............... 222/559, 561, 342, 410, 222/411; 198/532; 105/282.1, 282.2, 284; 414/304, 305, 306, 324, 327, 328

[56] References Cited

U.S. PATENT DOCUMENTS

| 3,485,183 | 12/1969 | Floehr | 105/282.1 |
| 3,509,828 | 5/1970 | Fritz | 105/282.1 |
| 3,710,960 | 1/1973 | Stauffer et al. | 414/324 |
| 4,252,299 | 2/1981 | LoBue | 222/561 X |

FOREIGN PATENT DOCUMENTS 551935 1/1958 Canada ............................ 222/559

Primary Examiner—Joseph E. Valenza
Assistant Examiner—Keith L. Dixon
Attorney, Agent, or Firm—Mason, Kolehmainen, Rathburn & Wyss

[57] ABSTRACT

A bottom discharge system for upright storage vessels adapted to contain solid, particulate and/or fibrous materials includes a flail chain type unloader for dislodging the material to be discharged including a rotary shaft extending upwardly through a central opening in the bottom wall of the storage vessel for moving material out of the lower end portion of the vessel when the shaft is rotated to swing the flail chains. The improved bottom discharge system includes a material outlet opening formed adjacent the bottom wall of the vessel extending radially outwardly of the shaft and a discharge gate that is movable radially inwardly and outwardly of the shaft for closing and opening the outlet. A gate cover structure is spaced above the gate and the bottom wall and has an open end facing the shaft to form a vertically extending segment of the discharge outlet so that when the shaft of the unloader begins to rotate, the material around the shaft is moved radially outwardly into the open end of the gate cover structure causing the material immediately above to flow downwardly for radial discharge and with a minimal tendency of the material to hang up and/or bridge across above the level of the discharge opening stopping the flow.

7 Claims, 4 Drawing Sheets

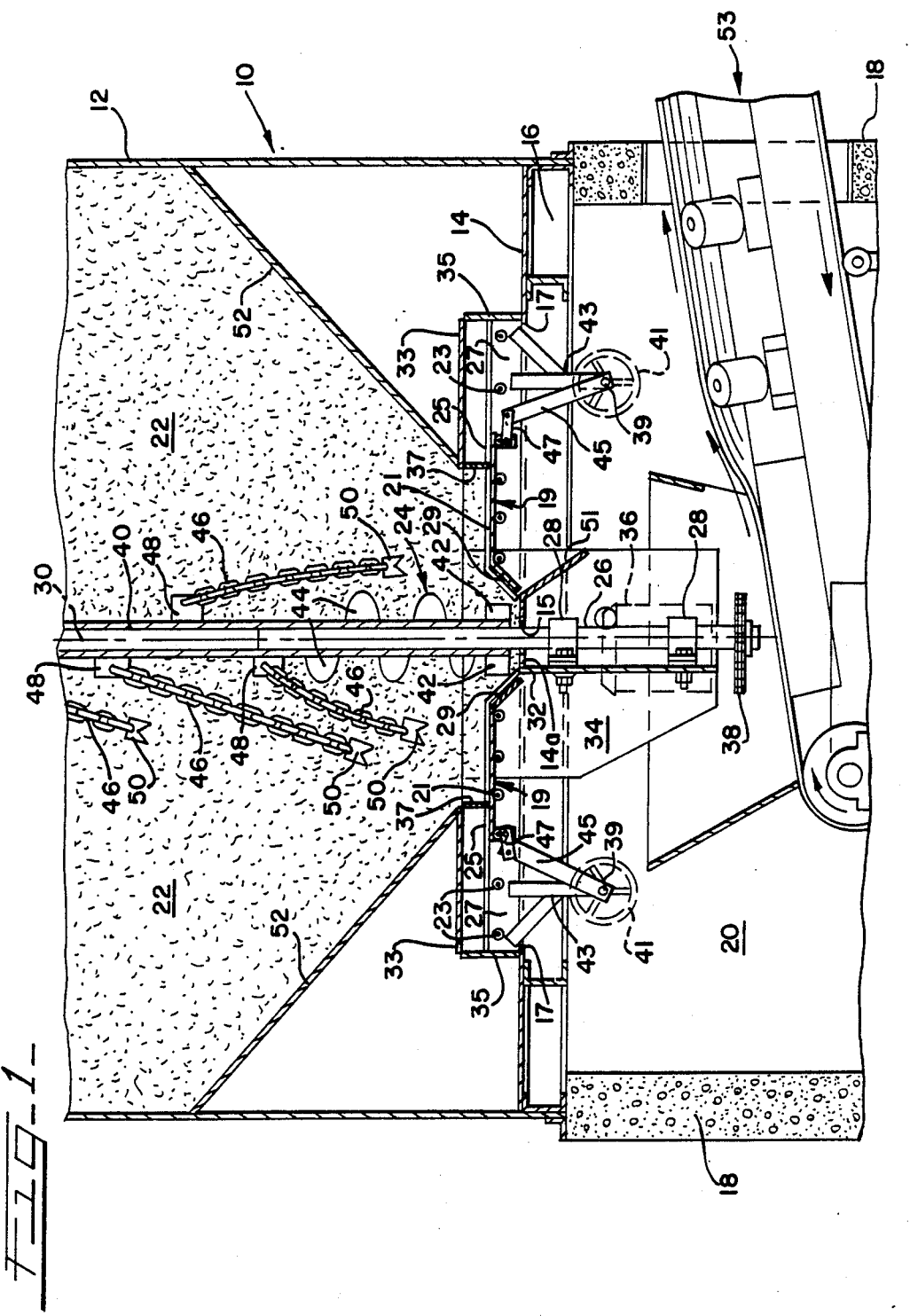

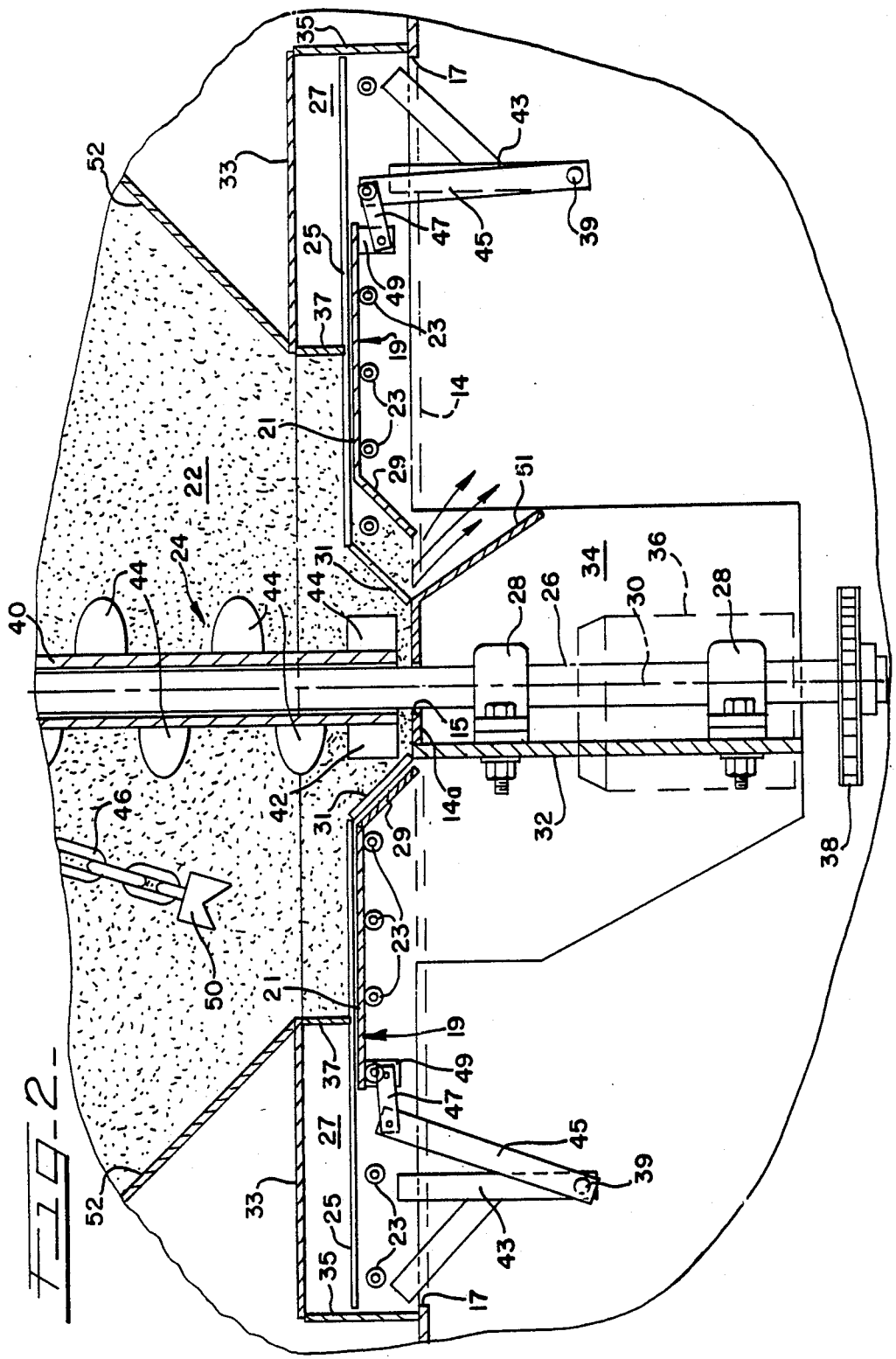

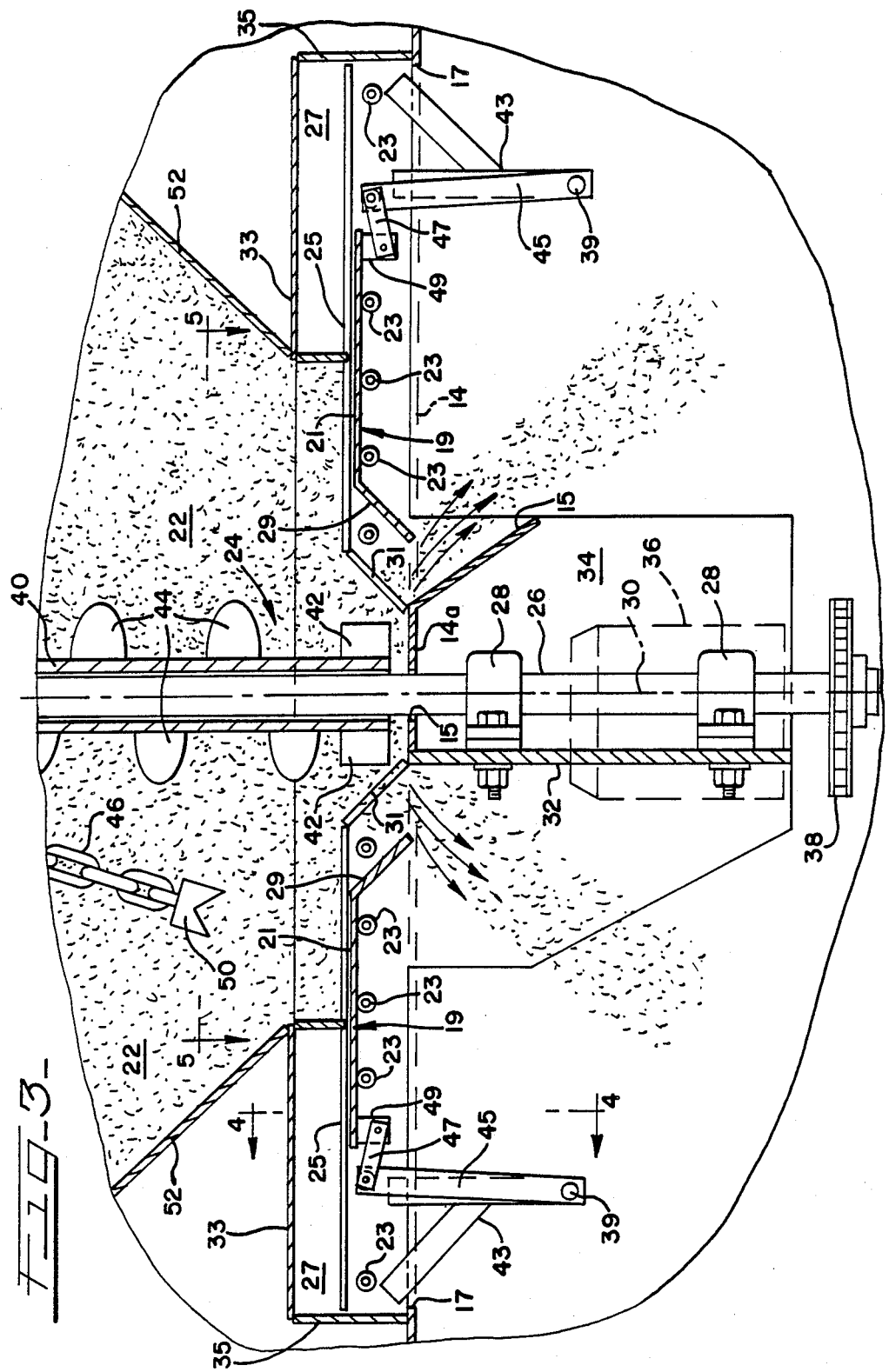

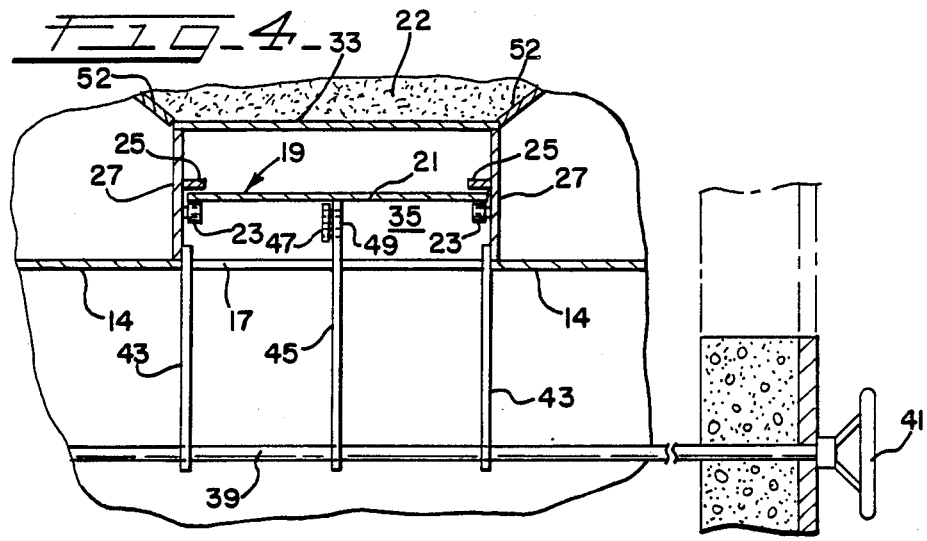
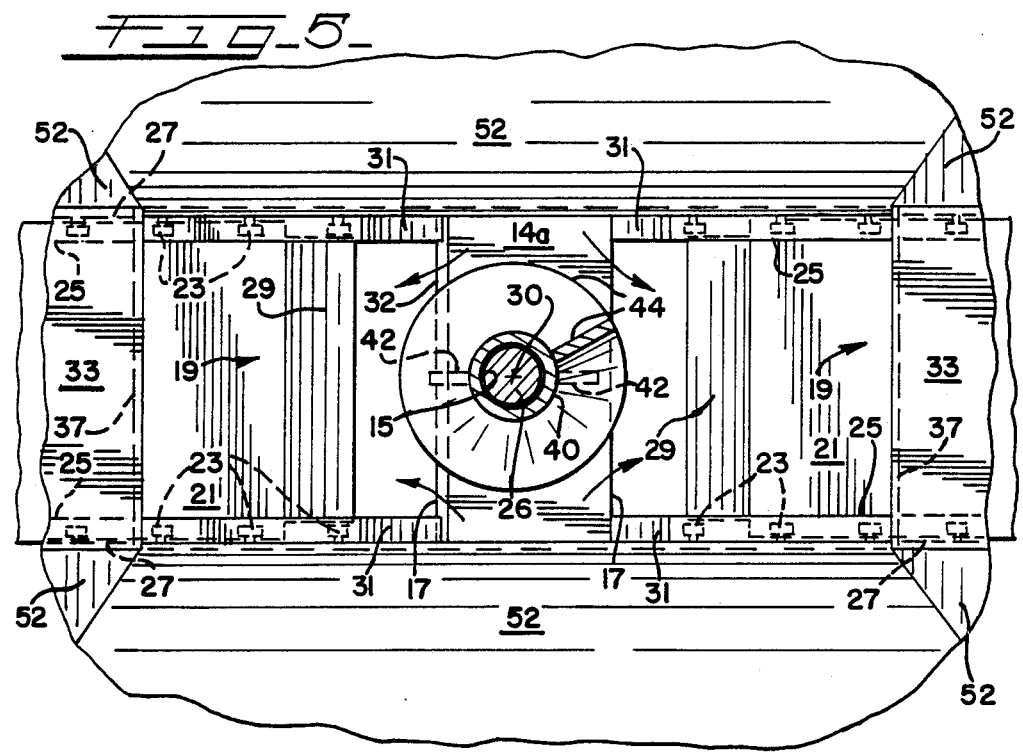

BOTTOM DISCHARGE APPARATUS FOR STORAGE VESSEL

BACKGROUND OF THE INVENTION

1. Field of the Invention

The present invention relates to a bottom discharge system for upright storage vessels used for containing solid, particulate and/or fibrous materials and including flail chain type unloaders mounted in the vessel for dislodging and moving material out through a discharge opening.

2. Background of the Prior Art

Agricultural silos, industrial silos and other types of upright storage vessels have been used for storing a wide variety of particulate and fibrous type materials. A great many such materials (especially when wet) tend to hang up or bridge across a bottom discharge opening commonly provided in such vessels and silos, even after a material retaining discharge gate has been opened and an unloader mechanism or flail type unloader has been set into operation for dispensing material from storage.

The following U.S. patents are directed to bottom discharge type silos and storage vessels and the present invention provides an improved discharge system for use in conjunction with storage vessels and silos of the same general types having unloaders of the type shown in these patents:

U.S. Pat. Nos. 3,710,960; 3,828,946; 3,828,947; 3,837,507 and 4,079,848.

OBJECTS OF THE INVENTION

It is an object of the present invention to provide a new and improved discharge system for bottom unloading storage vessel, silo and the like and more particularly, to provide a discharge system which is capable of handling a wide variety of particulate and/or fibrous materials, including materials which have a tendency to bridge across or hang up across a discharge opening even after a discharge gate previously covering the opening is opened therebelow.

Another object of the present invention is to provide a new and improved storage vessel including a discharge system and unloader which is capable of storing and reliably dispensing at selected flow rates a wide variety of particulate and fibrous material stored therein.

Still another object of the present invention is to provide a new and improved material, storage and discharge system of the character described which is reliable in operation, easy to use and maintain, relatively low in cost and which is suitable for a wide variety of different types of solid materials.

BRIEF SUMMARY OF THE INVENTION

The foregoing and other objects of the present invention are accomplished in an illustrated embodiment comprising a new and improved material discharge system for upright storage vessels, silos and the like commonly used for containing solid, particulate and/or fibrous materials. The silo includes a flail chain type unloader mounted adjacent a lower end including an upstanding rotary shaft with flail chains attached for moving material out through a discharge outlet when the shaft is rotated. The discharge system includes an outlet opening formed adjacent the bottom wall of the storage vellel or silo extending radially outward of the shaft of the unloader. A discharge gate is movable radially inwardly and outwardly of the shaft for closing and opening the discharge outlet. A gate cover structure is provided above the gate and bottom wall and has an open end facing the shaft to provide a vertically extending segment for receiving discharging material directly from raidal paddles mounted on the shaft. When the material immediately around the shaft at the bottom wall of the vessel is moved radially outward into the outlet opening in the open end of the cover upon initial rotation of the shaft, the material above this level falls downwardly into the area around the paddles and is discharged in a similar fashion with little or no tendency of the material to bridge across or hang up above the horizontally extending segment of the discharge opening that is uncovered when the gate is open.

BRIEF DESCRIPTION OF THE DRAWINGS

For a better understanding of the invention, reference should be had to the following detailed description taken in conjunction with the drawings, in which:

FIG. 1 is a fragmentary, vertical cross-sectional view of a storage vessel and unloader employing a discharge system in accordance with the features of the present invention;

FIG. 2 is an enlarged, fragmentary, vertical cross-sectional view illustrating the discharge system in an operating condition wherein one of a plurality of discharge gates is in an open position;

FIG. 3 is a similar enlarged, fragmentary, cross-sectional view showing the discharge system with a plurality of gates in an open position;

FIG. 4 is a fragmentary, cross-sectional view taken substantially along lines 4—4 of FIG. 3; and FIG. 5 is a cross-sectional plan view taken substantially along lines 5—5 of FIG. 3.

DETAILED DESCRIPTION OF PREFERRED EMBODIMENTS OF THE PRESENT INVENTION

Referring now more particularly to the drawings, therein is illustrated a new and improved bottom discharge system constructed in accordance with the present invention for use in an upright storage vessel or silo 10. The silo 10 includes an upstanding, cylindrical sidewall 12 and a circular bottom wall or base wall 14 supported on a framework 16 mounted on top of a concrete base or foundation 18 which provides an open space 20 under the bottom wall 14. This open space is adapted to accommodate a conveyor 53 or the like for receiving solid, particulate and/or fibrous materials 22 that is dispensed from the vessel 10 from time to time on an intermittent basis.

A flail chain type unloader 24 is mounted in the central portion of the vessel 10 adjacent the lower end and includes an upstanding rotatable shaft 26 supported for rotation by a pair of pillow block bearings 28 spaced below the bottom wall 14. The shaft 26 is coaxially aligned with a centerline vertical axis 30 of the storage vessel 10. The pillow block bearings 28 are supported on a vertically extending base plate 32 projecting downwardly from a central wall segment 14a of the bottom wall 14, of the vessel 10. The wall segment 14a is provided with a circular opening 16 at the center for accommodating the upwardly extending rotary shaft 26 and a shaft sealing structure, preferably of the type shown in U.S. Pat. No. 4,079,848, is provided to seal around the rotating shaft.

The bearing base plate 32 supporting the pillow blocks 28 is secured to a pair of downwardly extending, vertical side plates 34 on opposite edges thereof and one of the side plates provides a support base for a gear motor 36 drivingly interconnected to rotate the lower end of the shaft 26 by means of a chain and sprocket drive assembly 38 which provides for the proper amount of speed reduction needed for driving the upstanding flail chain supporting shaft 26.

The flail chain unloader 24 includes a hollow, tubular, chain supporting sleeve 40 mounted on an upper portion of the vertical center shaft 26 and the sleeve 40 provides support for a pair of small, radially extending blades 42 mounted adjacent the lower end portion of the sleeve above the central portion 14a of the vessel bottom wall 14. A helical screw auger 44 is attached to the sleeve 40 and extends upwardly of the radial blades 42. The screw auger 44 is pitched to move the material 22 positioned closely around the shaft sleeve 40 in a generally downward direction toward the central bottom wall portion 14a whenever the drive shaft 26 is in rotation.

Above the upper end of the screw auger 44, the flail chain unloader 24 is provided with a plurality of flail chains 46 at different levels and generally increasing lengths having inner ends secured by radial brackets 48 to the tubular sleeve 40 on opposite sides thereof as shown in FIGS. 1, 2 and 3. At the outer ends, the chains 46 are provided with sharp pointed diggers or cutters 50 for dislodging the material 22 to flow downwardly and inwardly towards the central portion of the vessel 10 whenever the unloader 24 is operating with the shaft 26 in rotation. The silo or vessel 10 may also be provided with downwardly and inwardly sloping, lower wall sections 52 for directing the material 22 dislodged from the lower end of the mass of material contained in the storage vessel toward the center thereof.

In accordance with the present invention, the bottom wall 14 of the vessel 10 is formed with one or more generally rectangular-shaped discharge openings 17 spaced radially outwardly of the central bottom wall portion 14a around the upstanding shaft 26. Each discharge opening 17 is provided with a slidable gate or door 19 movable between an inner closed position (FIG. 1) and an outer or open position (FIGS. 2 and 3) wherein material 22 may be discharged from the vessel to flow out and downwardly into the space 20 onto the conveyor 53.

Each discharge gate 19 includes a horizontally extending, relatively large, rectangular-shaped, outer section 21 slidably supported along opposite edges on a plurality of rollers 23 and an upwardly spaced, horizontally extending, guide element 25. The guide elements 25 and adjacent line of rollers 23 each form a guide track for constraining the horizontal section 21 of a gate 19 to move horizontally inwardly and outwardly in a radial direction toward and away from the central axis 30 of the vessel 10 and the shaft 26. The support rollers 23 and respective guide elements 25 are mounted on upstanding, side plates 27 which extend vertically upwardly from opposite edges of each discharge opening 17 as best shown in FIG. 4.

Each discharge gate 19 is also formed with an inwardly and downwardly sloping forward edge portion 29 fixedly secured to the adjacent inner edge of the horizontal gate section 21. The sloping edge portion has a lower edged adapted to engage and close against an inner edge of a respective discharge opening 17 when the gate is closed. As illustrated in FIG. 5, the downwardly and inwardly sloping forward sections 29 of the discharge gates 19 have a width slightly less than the spacing between the lines of rollers 23 on opposite side plates 27 so as to clear the rollers when the gate is moved outwardly into the open position. At the forward or inner end, each horizontal guide element 25 is joined with a downwardly and inwardly sloping, short section 31 adapted to fill in the space or opening that would otherwise be open between the bottom wall central section 14a and an upwardly spaced, fixed, horizontally extending cover plate 33 joined to the upper edges of respective pairs of side plates 27 along opposite edges thereof.

At the outer end, each cover plate 33 is joined with a downwardly extending, vertical end wall 35, which wall in turn is joined to an outer edge of a discharge opening 17 on the bottom wall 14. The walls 35 provide a stop for limiting the outward radial travel of the respective discharge gates 19. At the forward or inner edge, each discharge gate cover 33 is joined with a downwardly extending, vertical, inner end wall 37 completing a box-like, rectangular gate covering structure over each outlet opening 17 for enclosing, separating and protecting the horizontal segments 21 of the discharge gates 19 from the material 22 when in a fully open position with the outer edge of the gates abutting against the outer end wall 35 which acts as a stop.

It will thus be seen that an enclosure for each discharge gate 19 is provided including a top cover wall 33, an outer end wall 35, an inner end wall 37 and a pair of opposite sidewalls 27. The structure provides protection for the discharge gate 19 when in a partially or fully open position so that material 22 stored in the vessel 10 does not become permanently adhered to or lodged upon the movable gate 19 thus making movement of the gate difficult after extended periods of time. The gate guide members 25 also serve to protect the rollers 23 from the accumulation of material 22 so that each underlying row of rollers 23 will remain free, unobstructed and ready to rollingly support a gate after periods of time when unloading operations have ceased and the unloader 24 has been dormant.

Controlled movement of each discharge gate 19 between the open and closed positions is provided by an enlongated control shaft 39 having a hand wheel 41 at an outer end, outside of the silo or vessel 10 as shown in FIG. 4. Each control shaft 39 is supported on a pair of brackets 43 extending downwardly from opposite sidewalls 27 of each gate cover structure. The shaft 39 is interconnected with a respective gate 19 through a pair of pivotally interconnected links 45 and 47 and each link 47 is pivotally interconnected to a bracket 49 depending downwardly from the underside of the horizontal section 21 of the gate 19. Accordingly, when a control shaft 39 is rotated by an external hand wheel 41, the gate 19 is movable in a horizontal direction inwardly or outwardly in a radial direction toward or away from the central shaft 26 of the flail chain unloader 24 to open or close the associated outlet opening 17 in the bottom wall 14.

In accordance with the invention, when the gates 19 are in a fully closed position as shown in FIG. 1, the inwardly and downwardly sloping forward edge portion 29 of each gate 19 is seated against a pair of forward stops 31 and the entire portion of each discharge opening 17 radially inwardly of the inner end walls 37 of the cover plates 33 is closed off so that the material 22 in the vessel 10 does not flow down and out through the discharge openings. Material does, however, tend to fill in and flow around the shaft 26 and the sleeve 30 above the central portion 14a of the vessel bottom wall 14. When any gate 19 is moved radially outwardly from the closed position towards a flow controlling, partially open or a fully open position, the material 22 above the opening 17 then begins to fall freely downwardly onto the conveyor 53. The vertical spacing between the horizontal section 21 of the gates 19 and the bottom wall 14 of the silo 10 provides a vertically extensive space or opening portion directly facing the shaft 26 and paddles 42 so that radially outwardly directed material 22 encounters a clear space with no resistance and can flow easily out and down through a discharge outlet 17 onto the conveyor 53.

If the material 22 has been sitting without movement for a period of time and becomes packed tightly around the central sleeve 30 at the lower end, when rotation of the shaft 26 is initiated, the material is immediately engaged directly by the paddles or blades 42 and is moved rapidly outwardly in a radial horizontal direction above the bottom wall portion 14a into the open end of the gate cover structure below the edge of the wall 37. This material 22 is then free to fall downwardly through a discharge opening 17 and the pressure of packed material 22 above this level causes fresh material to drop downwardly along the sleeve 30 destroying any tendency for bridging of material above the discharge opening. Once the shaft 26 begins to rotate, the discharge flow of material 22 begins immediately any time that a controlled discharge gate 19 is moved out of a closed position toward an open position. Moreover, the cover plates 33 above the level of the horizontal sections 21 of the discharge gates 19 permits easy sliding movement of the discharge gates in a radial direction between a closed and a range of open positons without interference from adhering material to provide a desired rate of discharge flow dependent on the position of the gate 19 with respect to its associated opening 17. Each time a gate 19 is opened fully, all of the material 22 accumulated on the upper surface of the horizontal section 21 is scraped off by the inner end wall 37 and falls down through the associated outlet opening 17. This action provides assurance against permanent adherence of material on the gates.

In order to prevent the discharge of material 22 onto the pillow block bearings 28 and the drive mechanism 38, the discharge system of the present invention includes a downwardly sloping, material deflecting baffle plate 51 and the discharged material 22 flows over the baffle plate and down onto a discharge conveyor 53 or or other conveyance for further distribution.

Because each discharge opening 17 has an associated vertical component as well as a horizontal component in the bottom wall 14, even materials 22 of a type having a great tendency to bridge across an opening are reliably discharged without hang ups whenever the shaft 26 is energized to rotate, even after a long period of time when a gate 19 is initially opened again to start a material discharging operation. Thus one of the major problems associated with prior types of discharge systems having an outlet opening with a horizontal disposition only is eliminated. The radial paddles 42 on the sleeve 30 rotated by the shaft 26 cooperated to move the material 22 radially outwardly in a horizontal direction towards a clear and open vertical component of an associated discharge opening 17.

Many modifications and variations of the present invention are possible in light of the foregoing specification and thus, it is to be understood that within the scope of the appended claims, the invention may be practiced otherwise than specifically described.

What is claimed and desired to be secured by Letters Patent of the United States is:

1. In combination, an upright storage vessel for containing solid particulate material and a flail chain unloader mounted in said vessel and including an upstanding, chain supporting, rotary shaft extended upwardly through a central opening in a bottom wall of said vessel for discharging said material from said vessel upon rotation of said shaft, the improvement, comprising:
    discharge opening forming means adjacent said bottom wall and positioned radially outwardly of said shaft and a central section of said bottom wall;
    discharge gate means spaced above said bottom wall and movable radially outwardly of and inwardly toward said shaft for opening and closing said discharge opening means;
    gate cover means spaced above said gate means and said bottom wall of said vessel having an open end facing said shaft and forming an outer peripheral edge of said discharge opening means around an outwardly extended portion thereof for receiving material for discharge moving radially outward of said rotating shaft,
    said discharge gate means including a horizontal segment in parallel between said cover means and said bottom wall and a frontal segment sloping downwardly toward said shaft and extending between the level of said bottom wall and said horizontal segment;
    and radial blade means on said rotating shaft for moving said material radially outwardly toward said open end of said gate cover means when said gate means is in an open position and said shaft is rotated.

2. The combination of claim 1, wherein:
    said discharge opening means includes a sloped wall along opposite edges of said frontal segment when said gate means is in a closed position.

3. The combination of claim 2, wherein:
    said cover means includes means for supporting said gate means for longitudinal sliding movement toward and away from said shaft between open and closed positions in relation to said discharge opening means.

4. The combination of claim 3, wherein:
    said supporting means includes roller means engaging opposite edges of said horizontal segment of said gate means.

5. The combination of claim 3, wherein:
    said supporting means includes guide means for engaging opposite edges of said horizontal segment of said gate means.

6. The combination of claim 3, wherein:
    said supporting means comprises guide means for engaging upper surfaces along opposite edges of said horizontal segment of said gate means and roller means for supportively engaging lower surfaces of said horizontal segment below said guide means.

7. The combination of claim 6, wherein:
    said discharge opening means includes sloped walls along opposite edges of said frontal segment of said gate means and adjacent forward ends of said guide means providing stops for engaging said horizontal segment when said gate means is in said closed position.

* * * * *